United States Patent
Kensicher et al.

(10) Patent No.: US 8,110,130 B2
(45) Date of Patent: Feb. 7, 2012

(54) USE OF A RHEOLOGICAL ADDITIVE IN THE MANUFACTURE BY VIBROCOMPACTION OF A WATER AND HYDRAULIC BINDER BASED FORMULATION, FORMULATION OBTAINED

(75) Inventors: Yves Kensicher, Theize (FR); David Platel, Saint Maurice de Gourdans (FR)

(73) Assignee: Coatex S.A.S., Genay (FR)

( * ) Notice: Subject to any disclaimer, the term of this patent is extended or adjusted under 35 U.S.C. 154(b) by 64 days.

(21) Appl. No.: 12/521,091

(22) PCT Filed: Nov. 28, 2007

(86) PCT No.: PCT/IB2007/003790
§ 371 (c)(1),
(2), (4) Date: Jun. 24, 2009

(87) PCT Pub. No.: WO2008/084298
PCT Pub. Date: Jul. 17, 2008

(65) Prior Publication Data
US 2010/0010120 A1    Jan. 14, 2010

(30) Foreign Application Priority Data
Jan. 9, 2007   (FR) .................................... 07 00085

(51) Int. Cl.
*B28B 1/08* (2006.01)
(52) U.S. Cl. ............ 264/71; 264/77; 106/638; 106/802; 524/5; 524/558
(58) Field of Classification Search .......................... None
See application file for complete search history.

(56) References Cited

U.S. PATENT DOCUMENTS

| | | | |
|---|---|---|---|
| 6,616,874 B1 * | 9/2003 | Lazar | 264/71 |
| 2002/0042459 A1 | 4/2002 | Mayer et al. | |
| 2006/0054056 A1 | 3/2006 | Jungk | |

FOREIGN PATENT DOCUMENTS

| | | | |
|---|---|---|---|
| EP | 1 180 528 | | 2/2002 |
| EP | 1 182 235 | | 2/2002 |
| WO | 03 070658 | | 8/2003 |
| WO | WO03070658 | * | 8/2003 |

OTHER PUBLICATIONS

Machine translation of WO03070658.*

* cited by examiner

*Primary Examiner* — Milton I Cano
*Assistant Examiner* — Wenwen Cai
(74) *Attorney, Agent, or Firm* — Oblon, Spivak, McClelland, Maier & Neustadt, L.L.P.

(57) ABSTRACT

The present invention consists in the use, in a process of manufacture of a composition with a water and hydraulic binder base, of a rheological additive characterised in that it is an emulsion of at least one non-cross-linked copolymer, consisting of:
a) (meth)acrylic acid,
b) alkyl(meth)acrylate having 1 to 25 carbon atoms,
c) a monomer of formula $R_1—(R_2O)_m—R_3$, in which:
  $R_1$ designates a radical containing a polymerisable unsaturated group,
  $R_2O$ designates an alkylene oxide group having 1 to 6 carbon atoms,
  m is an integer between 20 and 30, preferentially between 23 and 27, and is very preferentially equal to 25,
  $R_3$ designates a linear or branched alkyl chain having 28 to 33 carbon atoms, preferentially 30 to 33 carbon atoms, and very preferentially having 32 carbon atoms.

The invention also concerns the formulations thus obtained.

22 Claims, 1 Drawing Sheet

USE OF A RHEOLOGICAL ADDITIVE IN THE MANUFACTURE BY VIBROCOMPACTION OF A WATER AND HYDRAULIC BINDER BASED FORMULATION, FORMULATION OBTAINED

CROSS REFERENCE TO RELATED APPLICATIONS

The present application is the national stage of international application PCT/IB2007/003790, filed on Nov. 28, 2007, and claims the benefit of the filing date of French Application No. 0700085, filed on Jan. 9, 2007.

The present invention concerns the technical sector of water-based formulations and at least one hydraulic binder, more specifically those obtained by a process of manufacture implementing a stage of vibrocompaction and involving the use of an agent to regulate the rheology of the said formulations.

With a view to obtaining a water-based part and at least one hydraulic binder, and using the technique of vibrocompaction, the following are generally implemented:

1) a stage of manufacture of a formulation containing at least one hydraulic binder, water, a rheological additive, and possibly granulates and possibly other additives, by blending of these different constituents,
2) a stage of rest of the formulation after blending,
3) a stage of introduction of the said formulation into a mould,
4) a stage which is a combination of a compression action and a vibration action exerted on the mould,
5) a stage of removal from the mould of the part obtained following stage 4).

BACKGROUND OF THE INVENTION

This technique is notably described in the document "Influence of admixture on the properties of porous and draining cement concrete" (*Matériaux and Constructions*, vol. 33, December 2000, pp 647-54). The Applicant indicates that through use of the term "granulates" the intention is to designate according to the term well known to the skilled man in the art fillers, fine sands, sands, gravel-sands mixtures, chippings, ballasts and their blends, as defined by French norm XP P 18-540 (the said norm in fact classifies these materials on the basis of a number of characteristics such as the size of the grains or the granular class, the fines content, the fineness module, cleanliness, indices of crushing, if applicable, sensitivity to freezing temperatures, hardness, etc.; characteristics which it is not essential to list here).

The rheological additive used in the course of this process must give the formulation a number of properties, in each of the stages characterising this process.

During stage 1) of blending, it is desirable that the formulation should have an excellent "fluidity"; this fluidity determines the uniform distribution of the different constituents in the blend. This fluidity leads to a low viscosity of the formulation during this stage.

After blending, i.e. during stage 2), the viscosity of the formulation must increase.

During stage 3) of introduction of the formulation into the mould, it is desirable that the said formulation should have a satisfactory "flow": this flow reflects the ability of the said formulation to be poured out continuously in the mould, without its viscosity increasing too greatly: this could notably obstruct the pipes through which the formulation transits before being introduced into the mould, or alternatively prevent complete filling of this mould, which ultimately leads to surface defects of the part thus manufactured. With a view to obtaining a satisfactory flow the viscosity of the formulation must be greatly reduced during this stage. In addition, this reduction must be as rapid as possible, since the operation of introducing the formulation in the mould lasts only a few seconds.

During stage 4) of vibrocompaction, in which the formulation is subject to substantial shearing stresses (vibration action) and pressure stresses (compacting action), an excellent "fluidity" is sought, which takes the form during this stage of a low value of viscosity of the formulation:
which enables the formulation to follow perfectly the inner surface of the mould into which it is introduced, firstly, without which defects on the surface of the end part might be observed,
and which enables within the mould a material to be obtained having excellent compactness, secondly, leading to an improvement of the mechanical resistance properties of the end part.

The Applicant stipulates that this compactness reflects at once a uniform distribution of the different constituents of the formulation within the mould, together with a reduced porosity within the end part, and also a reduced number of macroscopic defects (such as areas with high concentration of binder, or of granulates, when the latter are present in the formulation). Secondly, since the stages of introduction in the mould and of vibrocompaction last only a few tens of seconds, it is very important that the viscosity of the formulation should rapidly change from a high-value (condition at rest) to a low value (stages of introduction into the mould and of vibrocompaction).

Finally, following operation 5), removal from the mould, it is desired that an end part having the following characteristics is obtained:
"non-adhering", i.e. one which does not adhere to the internal walls of the mould, in order not to create surface defects,
and "cohesive", i.e. it retains the compactness which it has acquired during the vibrocompaction stage: the attempt is then made to obtain as rapid an increase as possible of the viscosity of the formulation, with a view to obtaining cohesion of the end part as rapidly as possible.

Thus, all these properties may be summarised by:
a high viscosity of the formulation in the absence of stress (stages of rest and of removal from the mould),
a low viscosity of the said formulation in the presence of a high shearing stresses (stages of blending, of introduction of the formulation into the mould and of vibrocompaction),
a very rapid change from a low viscosity under high shearing to a high viscosity under low shearing for this formulation, and vice versa,
a non-adhering and cohesive appearance of the end part when removed from the mould,
which will henceforth be qualified as the "complex technical problem" resolved in the present Application.

Continuing its research with a view to improving all these properties, the Applicant has developed the use of a rheological additive, in a process of manufacture by vibrocompaction of a water-based formulation and of at least one hydraulic binder, characterised in that the said additive is an emulsion of at least one non-cross-linked copolymer consisting:

a) of (meth)acrylic acid,
b) of alkyl(meth)acrylate having 1 to 25 carbon atoms, in which this alkyl methacrylate is preferentially ethyl (meth)acrylate, c) of a monomer of formula $R_1$—$(R_2O)_m$—$R_3$, in which:
   $R_1$ designates a radical containing an unsaturated polymerisable function, belonging to the group of vinylics, or to the group of acrylic, methacrylic, maleic esters, or to the group of unsaturated urethanes such as acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides, or again to the group constituted by acrylamide and methacrylamide, and preferentially methacrylic,
   $R_2O$ designates an alkylene oxide group having 1 to 6 carbon atoms, preferentially an ethylene oxide and propylene oxide group, and very preferentially an ethylene oxide group,
   m is an integer between 20 and 30, preferentially between 23 and 27, and is very preferentially equal to 25,
   $R_3$ designates a linear or branched alkyl chain having 28 to 33 carbon atoms, preferentially 30 to 33 carbon atoms, and very preferentially having 32 carbon atoms.

An examination of the state of the technique with a view to resolving the "complex technical problem" forming the subject of the present Application will demonstrate that none of the documents accessible to the skilled man in the art reveals or suggests the solution forming the subject of the present invention.

The skilled man in the art is familiar with document U.S. Pat. No. 6,573,326, which describes thickening agents with a base of partially saponified vinylic alcohol copolymers, able to be used in the manufacture of dies containing a hydraulic binder. This document reveals measures for spreading a cement composition, implemented after vibration of the said composition: the thickening agent according to the invention enables the value of the spreading to be reduced.

The skilled man in the art is also familiar with document US 2005/011416, which describes the use of a pair consisting of a thickening agent and a hydrophobic additive, in the manufacture of cement-based articles, notably through the vibrocompaction method. The thickening agent is chosen from among the carboxylic acids, the poly(meth)acrylates, polyurethanes, polyethers, alginates, polyoses, polyimines, polyamides, cellulose derivatives, silicic acid, while the hydrophobic additive is chosen from among the (hydro)silanes, the siloxanes, the silicons, the siliconates, the fluorosilicates, the fatty acids, the waxes, the epoxide, acrylic or polyurethane resins, the sodium silicates and the esters of silicic acid. It is indicated that when manufacturing a cement part by vibrocompaction, the use of this pair enables a uniform end product to be obtained, which does not adhere to the mould, and which has a satisfactory mechanical resistance.

Document FR 2 836 141 is also well-known; compared to the previous documents it draws the attention of the skilled man in the art to a certain type of polymers, which enable cement products manufactured by vibrocompaction to be given advantageous performance characteristics. These polymers consist of (meth)acrylic acid, alkyl (meth)acrylate acid, and of a third monomer having a polymerisable group, which is terminated by a fatty and/or hydrophobic chain. The operating mechanism of such polymers is not addressed in this document; it will be explained in detail when the teaching of document US 2006/054056, which gives a detailed explanation of this mechanism, is discussed.

Thus, document FR 2 836 141 describes compositions with a base of extrusible or pressable hydraulic binders, in which the water/binder ratio is less than or equal to 0.25, and containing a rheology agent consisting of methacrylic acid, an alkyl methacrylate which is preferentially ethyl(meth)acrylate, and of a third monomer including a polymerisable unsaturated group and a chain of the following type:

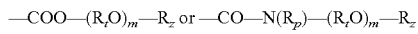

—COO—$(R_tO)_m$—$R_z$ or —CO—N$(R_p)$—$(R_tO)_m$—$R_z$ where $R_z$ is a linear or branched alkyl group having 1 to 35 carbon atoms,
$R_t$ is an alkylene group having 1 to 6 carbon atoms,
$R_p$ is H or an alkyl group having 1 to 8 carbon atoms,
m is between 1 and 50.

The examples and the claims of this document demonstrate that the preferred added monomers have chains having 5 to 35 ethoxylated units and a hydrophobic grouping having 18 to 35 carbon atoms, the most preferred added monomers being behenyletherpolyethylene glycol methacrylate and methoxypolyethylene glycol methacrylate having 10 to 35 ethoxylated units. The advantages procured by such polymers are improved mechanical performance, improved compactness and an absence of surface defects.

However, none of the 3 previous documents (U.S. Pat. No. 6,573,326, US 2005/011416, FR 2 836 141) seeks to resolve the "complex technical problem" forming the subject of the present Application. The Applicant indicates that the document acting as the closest state of the technique is document US 2006/054056. This document teaches the use, notably in the manufacture by vibrocompaction of parts containing a hydraulic binder, of different chemical additives which are, notably, associative polymers.

The Applicant wishes to indicate that the action mechanisms and the characteristics of the associative thickening agents, such as the associative thickening agents of the HASE (hydrophobically alkali swellable emulsions) type, are now well known, but have been essentially described in a field far removed from that of the present Application: that of paints. One can, for example, refer to the documents "Rheology modifiers for water-borne paints" (Surface Coatings Australia, 1985, pp. 6-10) and "Rheological modifiers for water-based paints: the most flexible tools for your formulations" (Eurocoat 97, UATCM, vol. 1, pp 423-442). These associative thickening agents are water-based polymers having insoluble hydrophobic groupings. Once such molecules are introduced into water, the hydrophobic groupings which they contain tend to assemble in the form of micellar aggregates. These aggregates are linked together by the hydrophilic parts of the polymers: there is then formation of a three-dimensional network which causes the viscosity of the medium to be increased. In the presence of a stress, destruction of the three-dimensional network occurs, and a reduction of the viscosity of the medium is observed.

As indicated in document US 2006/0054056, such polymers do not develop any thickening properties in the presence of shearing: the formulation is therefore very fluid during the vibrocompaction stage, which improves its compactness (reduction of porosity, of the number of macroscopic defects, uniform distribution of the constituents of the formulation). When the stress ceases the associative thickening mechanism develops, and a perfectly cohesive formulation is obtained, which enables its compactness to be retained, and an improved compression resistance to be acquired.

Thus, the purpose of document US 2006/0054056 is indeed to obtain a satisfactory flow of the formulation within the mould, a satisfactory fluidity of the said formulation during vibrocompaction, and a non-adhering and cohesive appearance of the end part on removal from the mould: no parts glued on to the inner walls of the mould are observed, nor surface defects of the manufactured part. It will, however, be noted that the complex technical problem forming the subject of the present Application is only partially resolved: indeed, document US 2006/0054056 does not seek to improve the rapidity of the transition between a low viscosity under high shearing and a high viscosity under low shearing, and vice versa. However, this is a fundamental property for the skilled man in the art, since it characterises the ability of a formulation rapidly to acquire a high degree of cohesion (when the part is removed from the mould), and its ability to be rapidly used in the mould (during filling and vibrocompaction). As will be seen below, not only does document US 2006/0054056 not seek to resolve this problem, but the particular polymers which it reveals do not enable this problem to be resolved.

The polymers used in this document are essentially thickening agents used in the field of paints, such as traditional acrylic thickening agents such as Carbopol™ (NOVEON™), or acrylic associative thickening agents belonging to the Aquaflow™ (HERCULES™), Acrysol™ and Acusol™ (ROHM & HAAS™) ranges, the preferred products, and those used in the examples, being Acrysol™ TT 935 (3 examples out of 4) and to a lesser degree Carbopol™ Aqua 30 (1 example out of 4). Acrysol™ TT 935 is a product consisting of methacrylic acid, ethyl acrylate acid, and an added monomer having a polymerisable function, having a link with 20 oxyethylated units and a fatty chain having 18 carbon atoms. Carbopol™ Aqua 30 is a cross-linked acrylic thickening agent.

BRIEF SUMMARY OF THE INVENTION

The Applicant, continuing its research with a view to improving, for a formulation containing water and at least one hydraulic binder, all the following properties:
high viscosity of the formulation in the absence of stress (stages of rest and of removal from the mould),
low viscosity of the formulation in the presence of a high shearing stresses (stages of blending, of introduction of the formulation into the mould and of vibrocompaction),
very rapid change from a low viscosity under high shearing to a high viscosity under low shearing, and vice versa,
non-adhering and cohesive appearance of the end part when removed from the mould,
has developed the use, in such a manufacturing process, of a rheological additive characterised in that it is an emulsion of at least one non-cross-linked copolymer, consisting of:
a) (meth)acrylic acid,
b) alkyl(meth)acrylate having 1 to 25 carbon atoms, preferentially 1 to 4 carbon atoms, in which this alkyl methacrylate is preferentially ethyl(meth)acrylate,
c) a monomer of formula $R_1-(R_2O)_m-R_3$, in which:
  $R_1$ designates a radical containing an unsaturated polymerisable function, belonging to the group of vinylics, or to the group of acrylic, methacrylic, maleic esters, or to the group of unsaturated urethanes such as acrylurethane, methacrylurethane, $\alpha$-$\alpha'$ dimethyl-isopropenyl-benzylurethane, allylurethane, or to the group of allylic or vinylic ethers, whether or not substituted, or again to the group of ethylenically unsaturated amides or imides, or again to the group constituted by acrylamide and methacrylamide, and preferentially methacrylic,
  $R_2O$ designates an alkylene oxide group having 1 to 6 carbon atoms, preferentially an ethylene oxide and propylene oxide group, and very preferentially an ethylene oxide group,
  m is an integer between 20 and 30, preferentially between 23 and 27, and is very preferentially equal to 25,
  $R_3$ designates a linear or branched alkyl chain having 28 to 33 carbon atoms, preferentially 30 to 33 carbon atoms, and very preferentially having 32 carbon atoms.

In a completely surprising manner, these copolymers enable the properties covered by the complex technical problem forming the subject of the present Application to be improved.

One of the Applicant's merits is that it has been able to identify, relative to document FR 2 836 141, preferential intervals for monomer c) in terms of the length of the alkylene oxide chain, on the one hand, and in terms of the length of the alkyl chain, on the other. The choice of these intervals also appears as a selection relative to document US 2006/054056, the general teaching of which consists in revealing the use of acrylic polymers, some of which are cross-linked, and others of which are associative, in a process of manufacture by vibrocompaction of a formulation containing water and at least one hydraulic binder.

Another of the Applicant's merits relates to the closeness of the intervals it proposes. Indeed, it appears that the selections according to the present invention are very small relative to the general teaching of document US 2006/054056 relating to the use of cross-linked or associative acrylic polymers, and relative to the wide intervals indicated in document FR 2 836 141, where 1 to 50 oxyethylated units and 1 to 35 carbon atoms are indicated in the terminal group of the third monomer.

Finally, another of the Applicant's merits relates to the particular values which delimit these intervals: these very particular values define a set of polymers which, in a completely surprising manner, which is much more advantageous than the polymers cited preferentially in documents FR 2 836 141 and US 2006/054056, substantially improve the rheological properties of the hydraulic binder-based compositions in which they are used. The examples of the present Application notably demonstrate that the polymers of the present invention enable:
  the value of the viscosity of the formulation to be improved very much more substantially than the preferred polymers disclosed in documents FR 2 836 141 and US 2006/054056, when this formulation is subjected to a low shearing,
  and above all, a much more rapid transition than the preferred polymers disclosed in documents FR 2 836 141 and US 2006/054056 from a low viscosity under high shearing to a high viscosity under low shearing, and vice versa,
whilst at the same time leading to a low viscosity under high shearing, and enabling cohesive and non-adhering parts to be obtained.

DETAILED DESCRIPTION OF THE INVENTION

Figure 1:
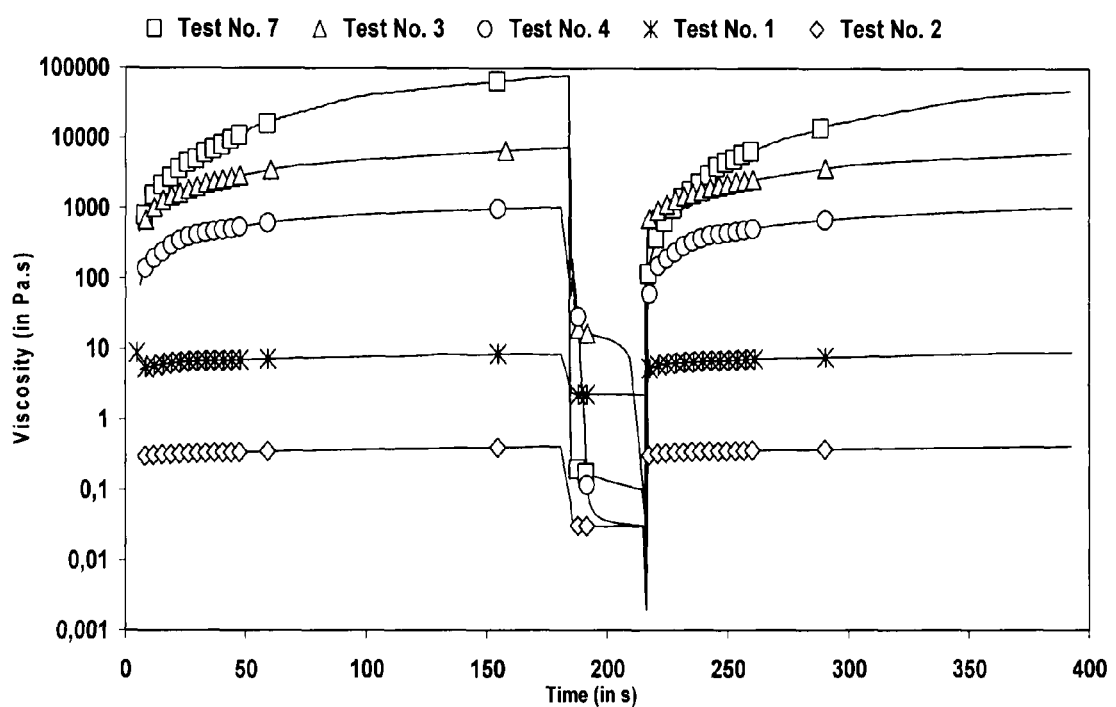
FIG. 1 shows test results of example 1 for low and high shearing stress of compositions comprising polymers of tests 1, 2, 3, 4, and 7.

Thus, a first object of the invention consists in the use of a rheological additive, in a process of manufacture by vibrocompaction of a formulation containing water and at least one hydraulic binder, where this use is characterised in that the said additive is an emulsion of at least one non-cross-linked copolymer, consisting of:

a) (meth)acrylic acid,
b) alkyl(meth)acrylate having 1 to 25 carbon atoms, preferentially 1 to 4 carbon atoms, in which this alkyl methacrylate is preferentially ethyl(meth)acrylate,
c) a monomer of formula $R_1—(R_2O)_m—R_3$, in which:
  $R_1$ designates a radical containing an unsaturated polymerisable function, belonging to the group of vinylics, or to the group of acrylic, methacrylic, maleic esters, or to the group of unsaturated urethanes such as acrylurethane, methacrylurethane, $\alpha$-$\alpha'$ dimethyl-isopropenyl-benzylurethane, allylurethane, or to the group of allylic or vinylic ethers, whether or not substituted, or again to the group of ethylenically unsaturated amides or imides, or again to the group constituted by acrylamide and methacrylamide, and preferentially methacrylic,
  $R_2O$ designates an alkylene oxide group having 1 to 6 carbon atoms, preferentially an ethylene oxide and propylene oxide group, and very preferentially an ethylene oxide group,
  m is an integer between 20 and 30, preferentially between 23 and 27, and is very preferentially equal to 25,
  $R_3$ designates a linear or branched alkyl chain having 28 to 33 carbon atoms, preferentially 30 to 33 carbon atoms, and very preferentially having 32 carbon atoms.

The Applicant indicates that the expression "rheological additive" is perfectly defined, in the sense that it refers to a compound enabling all the following properties to be improved:
  high viscosity in the absence of stress (stages of rest and of removal from the mould),
  low viscosity in the presence of a high shearing stresses (stages of blending, of introduction of the formulation into the mould and of vibrocompaction),
  very rapid change from a low viscosity under high shearing to a high viscosity under low shearing, and vice versa,
  non-adhering and cohesive appearance of the end part when removed from the mould.

This use of a rheological additive which is an emulsion of at least one non-cross-linked copolymer is also characterised in that the said copolymer consists, expressed as a percentage by weight of each of the constituents (the total a+b+c is equal to 100%), of:
a) 25% to 60%, preferentially 30% to 50% of (meth)acrylic acid,
b) 40% to 75%, preferentially 50% to 70% of alkyl(meth)acrylate having 1 to 25 carbon atoms, preferentially 1 to 4 carbon atoms, where this alkyl methacrylate is preferentially ethyl(meth)acrylate,
c) 1% to 20%, preferentially 5% to 15% of a monomer of formula $R_1—(R_2O)_m—R_3$, in which:
  $R_1$ designates a radical containing an unsaturated polymerisable function, belonging to the group of vinylics, or to the group of acrylic, methacrylic, maleic esters, or to the group of unsaturated urethanes such as acrylurethane, methacrylurethane, $\alpha$-$\alpha'$ dimethyl-isopropenyl-benzylurethane, allylurethane, or to the group of allylic or vinylic ethers, whether or not substituted, or again to the group of ethylenically unsaturated amides or imides, or again to the group constituted by acrylamide and methacrylamide, and preferentially methacrylic,
  $R_2O$ designates an alkylene oxide group having 1 to 6 carbon atoms, preferentially an ethylene oxide and propylene oxide group, and very preferentially an ethylene oxide group,
  m is an integer between 20 and 30, preferentially between 23 and 27, and is very preferentially equal to 25,
  $R_3$ designates a linear or branched alkyl chain having 28 to 33 carbon atoms, preferentially 30 to 33 carbon atoms, and very preferentially having 32 carbon atoms.

This use of a rheological additive which is an emulsion of at least one non-cross-linked copolymer, is also characterised in that the said copolymer is totally or partially neutralised by at least one neutralisation agent, chosen from among the hydroxides and/or oxides of calcium, magnesium, lithium or barium, the hydroxides of sodium, potassium, or ammonium, the primary, secondary or tertiary amines, or their blends.

This use of a rheological additive which is an emulsion of at least one non-cross-linked copolymer is also characterised in that the said copolymer is obtained by processes of radical polymerisation in solution, in a direct or reverse emulsion, in suspension or precipitation in solvents, in the presence of catalytic systems and chain transfer agents, or again by processes of controlled radical polymerisation, and preferentially by nitroxide mediated polymerisation (NMP) or by cobaloximes, by atom transfer radical polymerisation (ATRP), by controlled radical polymerisation by sulphurated derivatives, chosen from among carbamates, dithioesters or trithiocarbonates (RAFT) or xanthates.

This use of a rheological additive, in a process of manufacture by vibrocompaction of a formulation containing water and at least one hydraulic binder, is also characterised in that the water/hydraulic binder (E/L) weight ratio is strictly higher than 0.25, preferentially 0.30, and very preferentially 0.35.

This use of a rheological additive, in a process of manufacture by vibrocompaction of a formulation containing water and at least one hydraulic binder, is also characterised in that the said formulation contains 0.05% to 3%, preferentially 0.1% to 2%, very preferentially 0.1% to 1.5% by dry weight of the said rheological additive, relative to the dry weight of hydraulic binder.

This use of a rheological additive, in a process of manufacture by vibrocompaction of a formulation containing water and at least one hydraulic binder, is also characterised in that the said formulation also contains granulates.

This use of a rheological additive, in a process of manufacture by vibrocompaction of a formulation containing water and at least one hydraulic binder, is also characterised in that the said formulation also contains another additive chosen from among a plasticiser, a superplasticiser, a dispersing agent, an anti-foaming agent, or their blends.

This use of a rheological additive, in a process of manufacture by vibrocompaction of a formulation containing water and at least one hydraulic binder, is also characterised in that the said process comprises:
  1) a stage of manufacture of a formulation containing at least one hydraulic binder, water, possibly granulates and possibly other additives chosen from among a plasticiser, a superplasticiser, a dispersing agent, an anti-foaming agent or their blends, by blending of these different constituents,
  2) a stage of rest of the formulation after blending,
  3) a stage of introduction of the said formulation into a mould,
  4) a stage which is a combination of a compression action and a vibration action exerted on the mould,
  5) a stage of removal from the mould of the part obtained following stage 4).

This use of a rheological additive, in a process of manufacture by vibrocompaction of a formulation containing water and at least one hydraulic binder, is also characterised in that said hydraulic binder is selected among from lime, cement, plaster, fly ashes, blast furnace slags, soluble silicates, clays, zeolithes and mixtures thereof.

Another object of the invention is a formulation containing water and at least one hydraulic binder, together with a rheological additive characterised in that it is an emulsion of at least one non-cross-linked copolymer consisting of:
a) (meth)acrylic acid,
b) alkyl(meth)acrylate having 1 to 25 carbon atoms, preferentially 1 to 4 carbon atoms, in which this alkyl methacrylate is preferentially ethyl(meth)acrylate,
c) a monomer of formula $R_1—(R_2O)_m—R_3$, in which:
  $R_1$ designates a radical containing an unsaturated polymerisable function, belonging to the group of vinylics, or to the group of acrylic, methacrylic, maleic esters, or to the group of unsaturated urethanes such as acrylurethane, methacrylurethane, $\alpha$-$\alpha'$ dimethyl-isopropenyl-benzylurethane, allylurethane, or to the group of allylic or vinylic ethers, whether or not substituted, or again to the group of ethylenically unsaturated amides or imides, or again to the group constituted by acrylamide and methacrylamide, and preferentially methacrylic,
  $R_2O$ designates an alkylene oxide group having 1 to 6 carbon atoms, preferentially an ethylene oxide and propylene oxide group, and very preferentially an ethylene oxide group,
  m is an integer between 20 and 30, preferentially between 23 and 27, and is very preferentially equal to 25,
  $R_3$ designates a linear or branched alkyl chain having 28 to 33 carbon atoms, preferentially 30 to 33 carbon atoms, and very preferentially having 32 carbon atoms.

This formulation is also characterised in that the said non-cross-linked copolymer consists, expressed as a percentage by weight of each of the constituents (the total a+b+c is equal to 100%) of:
a) 25% to 60%, preferentially 30% to 50% of (meth)acrylic acid,
b) 40% to 75%, preferentially 50% to 70% of alkyl(meth)acrylate having 1 to 25 carbon atoms, preferentially 1 to 4 carbon atoms, where this alkyl methacrylate is preferentially ethyl(meth)acrylate,
c) 1% to 20%, preferentially 5% to 15% of a monomer of formula $R_1—(R_2O)_m—R_3$, in which:
  $R_1$ designates a radical containing an unsaturated polymerisable function, belonging to the group of vinylics, or to the group of acrylic, methacrylic, maleic esters, or to the group of unsaturated urethanes such as acrylurethane, methacrylurethane, $\alpha$-$\alpha'$ dimethyl-isopropenyl-benzylurethane, allylurethane, or to the group of allylic or vinylic ethers, whether or not substituted, or again to the group of ethylenically unsaturated amides or imides, or again to the group constituted by acrylamide and methacrylamide, and preferentially methacrylic,
  $R_2O$ designates an alkylene oxide group having 1 to 6 carbon atoms, preferentially an ethylene oxide and propylene oxide group, and very preferentially an ethylene oxide group,
  m is an integer between 20 and 30, preferentially between 23 and 27, and is very preferentially equal to 25,
  $R_3$ designates a linear or branched alkyl chain having 28 to 33 carbon atoms, preferentially 30 to 33 carbon atoms, and very preferentially having 32 carbon atoms.

This formulation is also characterised in that the said non-cross-linked copolymer is totally or partially neutralised by at least one neutralisation agent, chosen from among the hydroxides and/or oxides of calcium, magnesium, lithium or barium, the hydroxides of sodium, potassium, or ammonium, the primary, secondary or tertiary amines, or their blends.

This formulation is also characterised in that the said non-cross-linked copolymer is obtained by processes of radical polymerisation in solution, in a direct or reverse emulsion, in suspension or precipitation in solvents, in the presence of catalytic systems and chain transfer agents, or again by processes of controlled radical polymerisation, and preferentially by nitroxide mediated polymerisation (NMP) or by cobaloximes, by atom transfer radical polymerisation (ATRP), by controlled radical polymerisation by sulphurated derivatives, chosen from among carbamates, dithioesters or trithiocarbonates (RAFT) or xanthates.

This formulation containing water and at least one hydraulic binder, together with a rheological additive, is also characterised in that the water/hydraulic binder (E/L) ratio is strictly higher than 0.25, preferentially 0.30, and very preferentially 0.35.

This formulation containing water and at least one hydraulic binder, together with a rheological additive, is also characterised in that it contains 0.05% to 3%, preferentially 0.1% to 2%, very preferentially 0.1% to 1.5% by dry weight of the said rheological additive, relative to the dry weight of hydraulic binder.

This formulation containing water and at least one hydraulic binder, together with a rheological additive, is also characterised in that it also contains granulates.

This formulation containing water and at least one hydraulic binder, together with a rheological additive, is also characterised in that it also contains another additive chosen from among a plasticiser, a superplasticiser, a dispersing agent, an anti-foaming agent, or their blends.

This formulation containing water and at least one hydraulic binder, together with a rheological additive, is also characterised in that it is obtained by a process of vibrocompaction comprising:
1) a stage of manufacture of a formulation containing at least one hydraulic binder, water, possibly granulates and possibly other additives chosen from among a plasticiser, a superplasticiser, a dispersing agent, an anti-foaming agent or their blends, by blending of these different constituents,
2) a stage of rest of the formulation after blending,
3) a stage of introduction of the said formulation into a mould,
4) a stage which is a combination of a compression action and a vibration action exerted on the mould,
5) a stage of removal from the mould of the part obtained following stage 4).

This formulation containing water and at least one hydraulic binder, together with a rheological additive, is at least characterised in that said hydraulic binder is selected among from lime, cement, plaster, fly ashes, blast furnace slags, soluble silicates, clays, zeolithes and mixtures thereof.

The following examples illustrate the invention without however limiting its scope.

EXAMPLES

Example 1

This example illustrates the use of polymers according to the invention and according to the prior art, in formulations containing the said polymers, water and calcium hydroxide. It is indicated that the purpose of the calcium hydroxide is to reproduce the highly alkaline and calcareous medium encountered in a hydraulic binder formulation such as that used for the manufacture of the blocks.

These formulations are subjected to rheological stresses enabling the succession of the stages of the industrial process of vibrocompaction to be simulated, namely:
1) a stage of manufacture of the formulation by blending of the different constituents,
2) a stage of rest of the formulation after blending,
3) a stage of introduction of the said formulation into a mould,
4) a stage which is a combination of a compression action and a vibration action exerted on the mould,
5) a stage of removal from the mould of the part obtained following stage 4).

For each of the tests No 1 to 7, one begins by preparing a formulation according to the following procedure.

In a 300 ml beaker 181.3 g of process water is weighed, and 2 g of calcium hydroxide is then added whilst stirring moderately. After 3 minutes' stirring, 5 g by dry weight of the polymer for testing is then added, whilst continuing to stir. After this addition the formulation is homogenised for 5 minutes and then stored for 15 hours. After this time a series of rheological measurements is made using a rheometer sold by the company Haake™ with the name Rheostress™ RS 600. To this end the rheometer is fitted with a measuring module of the plan/plan type with a diameter of 60 mm. Approximately 2 ml of the formulation is then deposited on this module, and the separation between the two surfaces is adjusted to 0.5 mm.

The following cycles are then applied:
application of a low shearing corresponding to a stress equal to 5 Pascals for 180 seconds: this phase corresponds to the stages of storage after blending of the constituents (stage 2) and of removal from the mould (stage 5),
application of a high shearing corresponding to a stress equal to 200 Pascals for 30 seconds: this phase corresponds to the stages of blending (stage 1) and of introduction into the mould and of vibrocompaction (stages 4 and 5).

The changes in viscosity are represented in FIG. 1/1.

Dealing with the synthesis of the polymers according to the invention, 3 protocols have been first disclosed (a, b and c) for the manufacture of monomers of formula P $R_1$—$(R_2O)_m$—$R_3$.

The polymers according to the invention are then manufactured according to 2 protocols A and B.

Protocol a: Synthesis of Methacrylic Monomer
In a 1 L reactor, are weighted:
400 grams of the alcohol having 32 carbon atoms and condensed with 25 moles of molten ethylene oxide,
0.0994 gram of alloocimene,
43.75 grams of methacrylic anhydride.

The mixture is heated at 82° C.±2° C. and is cooked during 3 hours at this temperature. The obtained macromonomer is diluted with 396 grams of methacrylic acid in order to obtain a liquid solution at ambient temperature.

Protocol b: Synthesis of Urethan Monomer
In a first stage, a precondensate is manufactured by weighting in an erlen:
13.726 grams of di isocyanate toluene,
36.1 grams of ethyl acrylate,
0.077 gram of alloocimene,
0.198 gram of dibutyl tin dilaurate.
10.257 grams of ethylene glycol methacrylate and 10 grams of ethyl acrylate are weighted in a bulb. The content of the bulb in introduced in the erlen in 20 minutes at a temperature lower than 35° C., and the mixtures reacts during 30 minutes.

In a second stage, the condensation is carried out by weighting 132 grams of tri styryl phenol condensed with 25 moles of ethylene oxide in a 1000 mL reactor, kept molten at 65° C. The precondensate is then introduced in 20 minutes at 65° C. in the 1000 mL reactor and is cooked 2 hours at 65° C. At least, the mixture is diluted with 15.5 grams of ethyl acrylate and 84.6 grams of bi-permuted water, in order to obtain a liquid at ambient temperature.

Protocol c: Synthesis of Hemimaleate Monomer
In a 1 L reactor, are weighted:
400 grams of the alcohol having 32 carbon atoms and condensed with 25 moles of molten ethylene oxide,
0.0994 gram of alloocimene,
25.3 grams of maleic anhydride.

The mixture is heated at 82° C.±2° C. and is cooked during 3 hours at this temperature. The obtained macromonomer is diluted with 425 grams of methacrylic acid in order to obtain a liquid solution at ambient temperature.

Protocol A
In a 1 L reactor, are weighted 280 grams of bi-permuted water and 3.89 grams of dodecyl sodium sulfate. The starter is heated at 82° C.±2° C.

During this time, a pre emulsion is prepared, by weighting in a beaker:
112.4 grams of bi-permuted water,
2.1 grams of sodium dodecyl sulfate,
80.6 grams of methacrylic acid,
146.1 grams of ethyl acrylate,
55.6 grams of a macromonomer solution as disclosed in protocol a).

0.85 gram of ammonium persulfate diluted in 10 grams of bi-permuted water are then weighted for the first catalysor, and 0.085 gram of sodium metabisulfite diluted in 10 grams of bi-permuted water for the second catalysor. When the starter is at temperature, the 2 catalysors are added and the polymerisation is carried out during 2 hours at 76° C.±2° C., with the parallel addition of the pre emulsion. The pump is rinsed with 20 grams of bi-permuted water and the whole is cooked during 1 hour at 76° C.±2° C. After cooling at ambient temperature, the polymer thus obtained is filtered.

Protocol B
In a 1 L reactor, are weighted 280 grams of bi-permuted water and 3.89 grams of dodecyl sodium sulfate. The starter is heated at 82° C.±2° C.

During this time, a pre emulsion is prepared, by weighting in a beaker:
334 grams of bi-permuted water,
3.89 grams of sodium dodecyl sulfate,
80.6 grams of methacrylic acid,
160.55 grams of ethyl acrylate,
60.4 grams of the methacrylurethan solution as disclosed in protocol b).

0.33 gram of ammonium persulfate diluted in 10 grams of bi-permuted water are then weighted for the first catalysor, and 0.28 gram of sodium metabisulfite diluted in 10 grams of bi-permuted water for the second catalysor. When the starter is at temperature, the 2 catalysors are added and the polymerisation is carried out during 2 hours at 84° C.±2° C., with the parallel addition of the pre emulsion. The pump is rinsed with 20 grams of bi-permuted water and the whole is cooked during 1 hour at 84° C.±2° C. After cooling at ambient temperature, the polymer thus obtained is filtered.

Test No. 1
This test illustrates the prior art, and more specifically one of the polymers described and preferred in document US 2006/054056: it uses Carbopol™ Aqua 30, which is a cross-linked acrylic thickening polymer.

Test No. 2

This test illustrates the prior art, and more specifically one of the polymers described and preferred in document US 2006/054056: it uses Acrysol™ TT 935, which is an associative acrylic thickening copolymer consisting of:
a) methacrylic acid,
b) ethyl acrylate,
c) and an added monomer with an oxyethylated chain having 20 units of ethylene oxide, and terminated by a hydrophobic grouping having 18 carbon atoms.

Test No. 3

This test illustrates the prior art, and uses a copolymer disclosed for instance in the document WO 03/070658, and consisting of:
a) 36.8% of methacrylic acid,
b) 52.0% of ethyl acrylate,
c) 11.2% of a monomer of formula $R_1$—$(R_2O)_m$—$R_3$, in which:
  $R_1$ represents the methacrylate group,
  $R_2O$ designates an ethylene oxide group,
  m is equal to 25,
  $R_3$ designates a linear alkyl chain having 22 carbon atoms.

Test No. 4

This test illustrates the prior art, and uses a copolymer disclosed for instance in the document WO 03/070658, and consisting of:
a) 36.0% of methacrylic acid,
b) 53.7% of ethyl acrylate,
c) 10.3% of a monomer of formula $R_1$—$(R_2O)_m$—$R_3$, in which:
  $R_1$ represents the methacrylate group,
  $R_2O$ designates an ethylene oxide group,
  m is equal to 25,
  $R_3$ designates a branched alkyl chain having 20 carbon atoms.

Test No. 5

This test illustrates the prior art, and uses a copolymer consisting of:
a) 38.1% of methacrylic acid,
b) 54.2% of ethyl acrylate,
c) 10.3% of a monomer which is a methoxypolyethylene glycol methacrylate having 25 ethylene oxide units, of molecular weight equal to 1,100 g/mole,
as described, for example, in document FR 2 836 141.

Test No. 6

This test illustrates the prior art, and uses a copolymer disclosed for instance in the document WO 03/070658, and consisting of:
a) 38.1% of methacrylic acid,
b) 54.2% of ethyl acrylate,
c) 10.3% of a monomer of formula $R_1$—$(R_2O)_m$—$R_3$, in which:
  $R_1$ represents the methacrylate group,
  $R_2O$ designates an ethylene oxide group,
  m is equal to 30,
  $R_3$ designates a branched alkyl chain having 26 carbon atoms.

Test No. 7

This test illustrates the invention and uses a copolymer consisting of:
a) 38.1% of methacrylic acid,
b) 54.2% of ethyl acrylate,
c) 7.7% of a monomer of formula $R_1$—$(R_2O)_m$—$R_3$, in which:
  $R_1$ represents the methacrylate group,
  $R_2O$ designates an ethylene oxide group,
  m is equal to 25,
  $R_3$ designates a branched alkyl chain having 32 carbon atoms.

This copolymer is obtained from the synthesis protocol a) for the monomer of formula $R_1$—$(R_2O)_m$—$R_3$, and from the synthesis protocol A) (in which the skilled man in the art has calculated the weights of the various constituents as a function of the searched monomeric ratio) for the said copolymer.

Firstly, the Applicant indicates that the polymers used for tests No. 5 and 6 do not enable the series of measurements of viscosities, as indicated at the start of this example, to be made. Indeed, when the shearing stress reaches 200 Pascals the formulation in question is expelled out of the plan/plan measuring module, since the said formulation is far too fluid. From a practical standpoint, in industrial terms these properties lead to the expulsion of the formulation out of the mould when the vibrocompaction stage is entered. The polymers corresponding to these tests do not therefore satisfy the man skilled in the art.

For the other tests, an examination of FIG. 1 demonstrates that:
when the shearing stress is low (by analogy to stages 2) of rest after blending and 5) of removal from the mould), it is test No. 7, with the polymer according to the invention, which leads to the highest viscosity: this factor is very favourable for obtaining a perfectly cohesive part, when it is removed from the mould;
when the shearing stress increases the viscosity falls very suddenly in the case of the polymers in tests No. 3, 4 and 7, unlike the polymers used in tests No. 1 and 2: this property is very favourable for stage 3) of introduction of the formulation into the mould and stage 4) of vibrocompaction, in which the said formulation must acquire as rapidly as possible a state of great fluidity, in order satisfactorily to fill the mould, and fill it uniformly;
when the stress is once again reduced the viscosity increases for all the tests, but only test No. 7 leads to the highest viscosity: this is a factor in favour of a perfectly cohesive part, when the latter is removed from the mould according to stage 5) of the process;
generally speaking, it is test No. 7 which leads to the highest ratio between the viscosity values with high and low shearing (approximately equal to 5 decades, whereas it is only equal, at best, to approximately 4 decades in the case of the polymer of the prior art in test No. 3); this emphasises the rheological properties, which are particularly advantageous for a vibrocompaction application, provided by the polymer according to the invention: it gives the formulations into which it is incorporated two very different rheological profiles depending on the shearing state to which these formulations are subjected.

Consequently, only the polymer according to the invention, as used in test No. 7, enables the complex technical problem forming the subject of the present Application to be resolved.

Example 2

This example illustrates the industrial use of a polymer according to the invention, in a process of manufacture of a formulation which is a concrete block obtained by the technique of vibrocompaction.

This example also illustrates the formulation according to the invention thus obtained. For the production of concrete blocks (breeze-blocks, paving stones, etc.), the following are introduced into a mixer:
75 liters of water,
143 kg of cement, 200 kg of sand,
1000 kg of gravel,
420 grams of a polymer according to the invention which is a non-cross-linked copolymer consisting, expressed as a percentage by weight of each of the constituents:
For Test No. 8
a) of 38.1% of methacrylic acid,
b) of 54.2% of ethyl acrylate,
c) of 7.7% of a monomer of formula $R_1$—$(R_2O)_m$—$R_3$, in which:
  $R_1$ represents the methacrylate group,
  $R_2O$ designates an ethylene oxide group,
  m is equal to 25,
  $R_3$ designates a branched alkyl chain having 32 carbon atoms synthesis of which has been previously described.
For Test No. 9
a) of 37.0% of methacrylic acid,
b) of 55.0% of ethyl acrylate,
c) of 8.0% of a monomer of formula $R_1$—$(R_2O)_m$—$R_3$, in which:
  $R_1$ represents the group resulting from the condensation between ethylene glycol methacrylate and di isocyanate toluene,
  $R_2O$ designates an ethylene oxide group,
  m is equal to 25,
  $R_3$ designates the group tristyryl phenyl (30 carbon atoms)
the monomer of formula $R_1$—$(R_2O)_m$—$R_3$ being obtained according to protocol b), and the copolymer being obtained according to protocol B), in which the skilled man in the art has calculated the weights of the various constituents as a function of the searched monomeric ratio.
For Test No. 10
a) of 39.0% of methacrylic acid,
b) of 54.0% of ethyl acrylate,
c) of 7.0% of a monomer of formula $R_1$—$(R_2O)_m$—$R_3$, in which:
  $R_1$ represents the group hemimaleate,
  $R_2O$ designates an ethylene oxide group,
  m is equal to 25,
  $R_3$ designates the alkyl radical having 32 carbon atoms.
the monomer of formula $R_1$—$(R_2O)_m$—$R_3$ being obtained according to protocol c), and the copolymer being obtained according to protocol A), in which the skilled man in the art has calculated the weights of the various constituents as a function of the searched monomeric ratio.

The blend thus obtained is transferred into a hopper and then deposited on a vibrating horizontal platform. Using a slide the concrete is uniformly spread, whilst being subjected to vibration, in the mould. In the following stage the content of the latter is compacted under strong vibrations, in order to obtain the desired shape. Finally the concrete part is removed from the mould.

After removal from the mould it is observed for each test No. 8 to 10:
that the part has no surface defect, and that its shape perfectly fits with the of the mould,
that no residue of formulation remains in the mould glued on to the walls.

In addition, the mechanical resistance of the part thus obtained, measured according to norm NF EN 771-3, is then equal (in Mpa) to 10.1-10.0-9.9 respectively for tests No. 8, 9 and 10.

An attempt was made to manufacture a part, according to the method previously described, using the same formulation as the one indicated above, but without the polymer according to the invention: this proves impossible without reducing the quantity of water, which must then be equal to 66 liters. The mechanical resistance obtained and measured according to norm NF EN 771-3 is then equal to 9.1 Mpa. This therefore satisfactorily demonstrates that the polymers according to the invention also enable the mechanical resistance of the parts manufactured by vibrocompaction, using the method described in the present invention, to be increased.

Example 3

This example illustrates the industrial use of a polymer according to the invention, in a process of manufacture of a formulation which is a concrete block obtained by the technique of vibrocompaction.

For each test No. 11 to 16, concrete blocks are manufactured by introducing into a mixer of a certain number of constituents, as indicated in table 1.

TABLE 1

| | Formula for 1 m³ concrete | | | | | |
|---|---|---|---|---|---|---|
| Constituents | 11 | 12 | 13 | 14 | 15 | 16 |
| Cement CEM I 42.5 R "Ożarów" | 340 | 340 | 340 | 290 | 272 | 255 |
| Broken grit 2-8 mm "Truskawica" | 1046 | — | 512 | 512 | 512 | 507 |
| Gravel 2-8 mm "ZKSM" | — | 1023 | 518 | 512 | 512 | 512 |
| Sand 0-2 mm "Lyszkowice" | 958 | 960 | 960 | 960 | 950 | 960 |
| Chalk Betocarb MP | — | — | — | 55 | — | 85 |
| Fly ash "Kozienice" | — | — | — | — | 68 | — |
| Polymer according to test No. | 8 | 9 | 10 | 8 | 9 | 10 |
| % (dry weight) of used polymer/dry weight of concrete | 0.34 | 1.0 | 1.0 | 1.0 | 1.0 | 1.0 |
| Added water (for: water/cement = 0.36) | 122 | 122 | 122 | 122 | 122 | 122 |
| Total mass of constituents per 1 m³ | 2466 | 2446 | 2452 | 2452 | 2437 | 2442 |

The blend thus obtained is transferred into a hopper and then deposited on a vibrating horizontal platform. Using a slide the concrete is uniformly spread, whilst being subjected to vibration, in the mould. In the following stage, the content of the latter is compacted under strong vibrations, in order to obtain the desired shape. Finally the concrete part is removed from the mould.

It is observed, for each test No. 11 to 16 illustrating the invention, that the part has no surface defect, that its shape perfectly fits with the of the mould, and that no residue of formulation remains in the mould glued on the walls.

The invention claimed is:
1. A process, comprising carrying out vibrocompaction of a formulation comprising:
  at least one non-cross-linked copolymer;
  water;

at least one hydraulic binder; and a rheological additive, wherein the additive is an emulsion of the at least one non-cross-linked copolymer, wherein the copolymer comprises:

a) (meth)acrylic acid;

b) alkyl (meth)acrylate having 1 to 25 carbon atoms; and c) a monomer of formula $R_1—(R_2O)_m—R_3$, wherein $R_1$ designates a radical having an unsaturated polymerizable function, wherein the radical comprises at least one selected from the group consisting of a vinylic, an acrylic ester, a methacrylic ester, a maleic ester, an unsaturated urethane, an allylic ether, a vinylic ether, whether or not substituted, an ethylenically unsaturated amide, an ethylenically unsaturated imide, acrylamide, and methacrylamide, $R_2O$ designates an alkylene oxide group having 1 to 6 carbon atoms, m is an integer between 20 and 30, and $R_3$ designates a linear or branched alkyl chain having 28 to 33 carbon atoms, and wherein a weight ratio of the water to the hydraulic binder, E/L ratio, is higher than 0.25.

2. The process of claim 1, wherein the copolymer, expressed as a percentage by weight of each of the constituents, wherein a sum of a), b) and c) is 100%, consists of:

a) 25% to 60% of (meth)acrylic acid;

b) 40% to 75% of alkyl (meth)acrylate having 1 to 25 carbon atoms; and c) 1% to 20% of a monomer of formula $R_1—(R_2O)_m—R_3$, wherein $R_1$ designates a radical having an unsaturated polymerizable function, wherein the radical comprises at least one selected from the group consisting of a vinylic, an acrylic ester, a methacrylic ester, a maleic ester, an unsaturated urethane, an allylic ether, a vinylic ether, whether or not substituted, an ethylenically unsaturated amide, an ethylenically unsaturated imide, acrylamide, and methacrylamide, $R_2O$ designates an alkylene oxide group having 1 to 6 carbon atoms, m is an integer between 20 and 30, and $R_3$ designates a linear or branched alkyl chain having 28 to 33 carbon atoms.

3. The process of claim 1, wherein the copolymer is totally or partially neutralized by at least one neutralization agent selected from the group consisting of calcium hydroxide, calcium oxide, magnesium hydroxide, magnesium oxide, lithium hydroxide, magnesium oxide, barium hydroxide, barium oxide, sodium hydroxide, potassium hydroxide, ammonium hydroxide, a primary amine, a secondary amine, and a tertiary amine.

4. The process of claim 1, wherein the copolymer is obtained by radical polymerization or controlled radical polymerization in solution, in a direct or reverse emulsion, in suspension or precipitation in at least one solvent, in the presence of at least one selected from the group consisting of a catalytic system and a chain transfer agent;

controlled radical polymerization;

atom transfer radical polymerization (ATRP); or controlled radical polymerization by at least one sulfurated derivative selected from the group consisting of a carbamate, a dithioester, a trithiocarbonate (RAFT), and a xanthate.

5. The process of claim 1, wherein the weight ratio of the water to the hydraulic binder, E/L ratio, is higher than 0.35.

6. The process of claim 1, wherein the formulation comprises:

0.05% to 3% by dry weight of the rheological additive, relative to a dry weight of the hydraulic binder.

7. The process of claim 1, wherein the formulation further comprises:

at least one granulate.

8. The process of claim 1, wherein the formulation further comprises:

at least one further additive selected from the group consisting of a plasticizer, a superplasticizer, a dispersing agent, and an anti-foaming agent.

9. The process of claim 1, comprising:

1) blending the at least one hydraulic binder, water, optionally at least one granulate and optionally at least one other additive selected from the group consisting of a plasticizer, a superplasticizer, a dispersing agent, and an anti-foaming agent, to form a formulation;

2) resting the formulation after blending;

3) introducing the formulation into a mold;

4) exerting a combination of compression and vibration on the mold to form a part; and 5) removing from the mold the part obtained by the exerting 4).

10. The process of claim 1, wherein the hydraulic binder is at least one selected from the group consisting of lime, cement, plaster, a fly ash, a blast furnace slag, a soluble silicate, a clay, and a zeolite.

11. A formulation, comprising;

at least one non-cross-linked copolymer;

water;

at least one hydraulic binder; and a rheological additive, wherein the formulation is an emulsion of the at least one non-cross-linked copolymer, wherein the copolymer comprises:

a) (meth)acrylic acid;

b) alkyl (meth)acrylate having 1 to 25 carbon atoms; and c) a monomer of formula $R_1—(R_2O)_m—R_3$, wherein $R_1$ designates a radical having an unsaturated polymerizable function, wherein the radical comprises at least one selected from the group consisting of a vinylic, an acrylic ester, a methacrylic ester, a maleic ester, an unsaturated urethane, an allylic ether, a vinylic ether, whether or not substituted, an ethylenically unsaturated amide, an ethylenically unsaturated imide, acrylamide, and methacrylamide, $R_2O$ designates an alkylene oxide group having 1 to 6 carbon atoms, m is an integer between 20 and 30, and $R_3$ designates a linear or branched alkyl chain having 28 to 33 carbon atoms, and wherein a weight ratio of the water to the hydraulic binder, E/L ratio, is higher than 0.25.

12. The formulation of claim 11, wherein the non-cross-linked copolymer, expressed as a percentage by weight of each of the constituents wherein a sum of a), b) and c) is 100%, consists of:

a) 25% to 60% of (meth)acrylic acid, b) 40% to 75% of alkyl (meth)acrylate having 1 to 25 carbon atoms and c) 1% to 20% of a monomer of formula $R_1—(R_2O)_m—R_3$, wherein $R_1$ designates a radical having an unsaturated polymerizable function, wherein the radical comprises at least one selected from the group consisting of a vinylic, an acrylic ester, a methacrylic ester, a maleic ester, an unsaturated urethane, an allylic ether, a vinylic ether, whether or not substituted, an ethylenically unsaturated amide, an ethylenically unsaturated imide, acrylamide, and methacrylamide, $R_2O$ designates an alkylene oxide group having 1 to 6 carbon atoms, m is an integer between 20 and 30, and $R_3$ designates a linear or branched alkyl chain having 28 to 33 carbon atoms.

13. The formulation of claim 11, wherein the non-cross-linked copolymer is totally or partially neutralized by at least one neutralization agent selected from the group consisting of calcium hydroxide, calcium oxide, magnesium hydroxide, magnesium oxide, lithium hydroxide, magnesium oxide, barium hydroxide, barium oxide, sodium hydroxide, potassium hydroxide, ammonium hydroxide, a primary amine, a secondary amine, and a tertiary amine.

14. The formulation of claim 11, wherein the non-cross-linked copolymer is obtained by radical polymerization or controlled radical polymerization
   in solution, in a direct or reverse emulsion, in suspension or precipitation in at least one solvent, in the presence of at least one selected from the group consisting of a catalytic system and a chain transfer agent;
   controlled radical polymerization;
   atom transfer radical polymerization (ATRP); or
   controlled radical polymerization by at least one sulfurated derivative selected from the group consisting of a carbamate, a dithioester, a trithiocarbonate (RAFT), and a xanthate.

15. The formulation of claim 11, wherein the weight ratio of the water to the hydraulic binder, E/L ratio, is strictly higher than 0.35.

16. The formulation of claim 11, wherein the formulation comprises:
   0.05% to 3% by dry weight of the rheological additive, relative to a dry weight of the hydraulic binder.

17. The formulation of claim 11, wherein the formulation further comprising:
   at least one granulate.

18. The formulation of 11, further comprising at least one further additive selected from the group consisting of a plasticizer, a superplasticizer, a dispersing agent, and an anti-foaming agent.

19. The formulation of claim 11, obtained by a process of vibrocompaction comprising:
   1) blending the at least one hydraulic binder, water, optionally at least one granulate and optionally at least one other additive selected from the group consisting of a plasticizer, a superplasticizer, a dispersing agent, and an anti-foaming agent, to form the formulation;
   2) resting the formulation after blending;
   3) introducing the formulation into a mold;
   4) exerting a combination of compression and vibration on the mold to form a part;
   5) removing from the mold the part obtained by the exerting 4).

20. The formulation of claim 11, wherein the hydraulic binder is at least one selected from the group consisting of lime, cement, plaster, a fly ash, a blast furnace slag, a soluble silicate, a clay, and a zeolite.

21. The process of claim 1, wherein the weight ratio of the water to the hydraulic binder, E/L ratio, is higher than 0.52.

22. The formulation of claim 11, wherein the weight ratio of the water to the hydraulic binder, E/L ratio, is higher than 0.52.

* * * * *